(12) United States Patent
Yokoyama et al.

(10) Patent No.: US 11,809,619 B1
(45) Date of Patent: Nov. 7, 2023

(54) DISPLAY SYSTEMS WITH OPTICAL SENSING

(71) Applicant: Apple Inc., Cupertino, CA (US)

(72) Inventors: Yoshihiko Yokoyama, Katta-gun (JP); John N. Border, Campbell, CA (US); Naoto Matsuyuki, Kasugai (JP); Serhan O. Isikman, Redwood City, CA (US); Wei-Liang Hsu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/077,823

(22) Filed: Oct. 22, 2020

Related U.S. Application Data (60) Provisional application No. 62/934,143, filed on Nov. 12, 2019.

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 2027/0138* (2013.01)

(58) Field of Classification Search
CPC .......... G02B 1/02; G02B 1/041; G02B 13/18; G02B 17/08; G02B 25/001; G02B 27/0172; G02B 27/0176; G02B 3/0062; G02B 3/0087; G02B 7/003; G02B 7/02; G02B 7/021; G02B 7/12; G02B 30/52; G02B 2027/0127; G06F 3/013
See application file for complete search history.

(56) References Cited

U.S. PATENT DOCUMENTS

| | | |
|---|---|---|
| 5,949,583 A | 9/1999 | Rallison et al. |
| 8,472,120 B2 | 6/2013 | Border et al. |
| 9,097,890 B2 * | 8/2015 | Miller ................ G02B 27/0093 |
| 9,366,862 B2 * | 6/2016 | Haddick ................ G06F 1/163 |
| 9,529,192 B2 | 12/2016 | Border |
| 9,715,114 B2 | 7/2017 | Yun et al. |
| 9,720,232 B2 | 8/2017 | Hua et al. |
| 10,317,678 B2 | 6/2019 | Aksit et al. |
| 10,394,040 B2 | 8/2019 | Gollier et al. |
| 10,495,798 B1 | 12/2019 | Peng et al. |

(Continued)

FOREIGN PATENT DOCUMENTS

JP 2012118237 A * 6/2012

*Primary Examiner* — Nelson M Rosario
(74) *Attorney, Agent, or Firm* — Treyz Law Group, P.C.; G. Victor Treyz; David K. Cole (57) ABSTRACT

A head-mounted device may have catadioptric lenses that each include a partial mirror, a quarter wave plate, and a polarizer. An optical system in the head-mounted device may have an infrared light-emitting device and an infrared light-sensing device. The optical system may illuminate a user's eyes in eye boxes and may gather measurements from the illuminated eye boxes for eye tracking and other functions. The optical system may operate through the catadioptric lenses. To enhance optical system performance, the polarizers may be wire grid polarizers that are formed from conductive lines that exhibit enhanced infrared transmission and/or the quarter wave plates may be formed from cholesteric liquid crystal layers that serve as quarter wave plates at visible wavelengths and that do not serve as quarter wave plates at infrared wavelengths.

27 Claims, 8 Drawing Sheets

(56) References Cited

U.S. PATENT DOCUMENTS

| | | |
|---|---|---|
| 11,016,302 B2 | 5/2021 | Freeman et al. |
| 11,132,055 B2 | 9/2021 | Jones et al. |
| 2007/0177275 A1* | 8/2007 | McGuire, Jr. ...... G02B 27/0172 |
| | | 359/630 |
| 2017/0173262 A1 | 6/2017 | Veltz |
| 2019/0243147 A1 | 8/2019 | Smithwick et al. |
| 2019/0377183 A1* | 12/2019 | Sharp ................. G02B 27/0983 |
| 2020/0174284 A1 | 6/2020 | Chan et al. |
| 2021/0333628 A1 | 10/2021 | Awaya et al. |

* cited by examiner

DISPLAY SYSTEMS WITH OPTICAL SENSING

This application claims the benefit of provisional patent application No. 62/934,143, filed Nov. 12, 2019, which is hereby incorporated by reference herein in its entirety.

FIELD

This relates generally to electronic devices, and, more particularly, to electronic devices with optical components.

BACKGROUND

Electronic devices sometimes include optical components. For example, a wearable electronic device such as a head-mounted device may include a display for displaying an image.

Lenses may be used to allow a user of a head-mounted device to focus on a display and view an image. Lenses such as catadioptric lenses may help reduce lens size and weight, making a head-mounted device comfortable to wear. Catadioptric lenses may include optical components such as partial mirrors, wave plates, and polarizers. If care is not taken, there may be incompatibilities between these components and other components in a head-mounted device. For example, there may be a risk that the optical characteristics of these components will adversely affect the operation of optical sensors.

SUMMARY

An electronic device such as a head-mounted device may have a display that displays an image for a user. A user with eyes located in eye boxes may view the image through lenses that are interposed between the eye boxes and the display. The lenses may be catadioptric lenses.

A catadioptric lens for a head-mounted device may include a partial mirror, a quarter wave plate, and a polarizer. An optical system in the head-mounted device may be used for eye tracking and other functions.

The optical system may have an infrared light-emitting device and an infrared light-sensing device. The optical system may illuminate the eye boxes and may gather measurements on the illuminated eye boxes during operation of the head-mounted device.

The optical system may operate through catadioptric lens structures. For example, the light-emitting device may emit infrared illumination that passes through a catadioptric lens and corresponding reflected light from the eye boxes may pass through the catadioptric lens to the light-sensing device.

To enhance optical system performance, the polarizers in the catadioptric lenses may be may exhibit enhanced infrared transmission relative to visible light transmission. At visible light wavelengths, the polarizers serve as linear polarizers. At infrared light wavelengths, the polarizers are transparent and allow infrared light associated with the optical system to pass.

In some configurations, the quarter wave plates of the catadioptric lenses are formed from cholesteric liquid crystal layers that serve as quarter wave plates at visible wavelengths and that do not serve as quarter wave plates at infrared wavelengths. Arrangements may also be used in which light-emitting devices in the optical system are provided with polarizers that polarize emitted light to enhance transmission through the catadioptric lenses and/or in which light-emitting devices and/or light-sensing devices are located between the lenses and the eye boxes.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain optical components such as a display for displaying visual content and lenses for allowing the user to view the visual content on the display. Optical sensors such as infrared sensors may be used to gather information on a user's eyes, facial features, or other body characteristics. This information may be used for eye tracking (sometimes referred to as gaze tracking), may be used for authentication (e.g., eye biometrics for user identification), facial recognition, and/or other device operations.

During operation, infrared sensors may emit and detect infrared light. This light may pass through the lenses in the head-mounted device. The lenses may be catadioptric lenses having optical components such as partial mirrors, wave plates, and polarizers. To help ensure compatibility between the infrared sensors and the lenses, one or more of the optical components in the lenses may be formed from material that is more transparent at infrared wavelengths than at visible wavelengths or has other wavelength-dependent properties.

Figure 1:
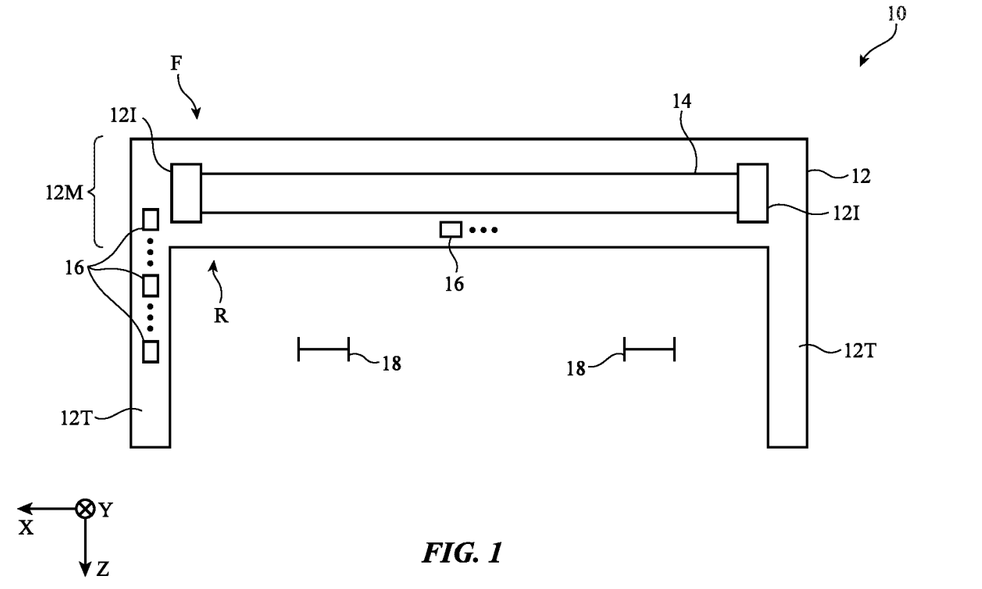
FIG. 1 is a top view of an illustrative electronic device such as a head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portion 12T to allow device 10 to be worn on a user's head. Main housing portion 12M may include optical components 14 (e.g., a display, lenses, etc.). Housing structures such as internal support structures 121 may support lenses and other optical components 14 (e.g., structures 121 may serve as lens support structures).

Front face F of housing 12 may face outwardly away from a user's head. Rear face R of housing 12 may face the user. During operation, a user's eyes are placed in eye boxes 18. When the user's eyes are located in eye boxes 18, the user may view content being displayed by optical components 14. In some configurations, optical components 14 are configured to display computer-generated content that is overlaid over real-world images (e.g., a user may view the real world through components 14). In other configurations, which are sometimes described herein as an example, real-world light is blocked (e.g., by an opaque housing wall on front face F of housing 12 and/or other portions of device 10).

The support structures of device 10 may include adjustable components. For example, portion 12T of housing 12 may include adjustable straps or other structures that may be adjusted to accommodate different head sizes. Support structures 121 may include motor-driven adjustable lens mounts, manually adjustable lens mounts, and other adjustable optical component support structures. Structures 121 may be adjusted by a user to adjust the locations of eye boxes 18 to accommodate different user interpupillary distances. For example, in a first configuration, structures 121 may place lenses and other optical components associated respectively with the user's left and right eyes in close proximity to each other so that eye boxes 18 are separated from each other by a first distance and, in a second configuration, structures 121 may be adjusted to place the lenses and other optical components associated with eye boxes 18 in a position in which eye boxes are separated from each other by a second distance that is larger than this distance. Lens position adjustments and other adjustments may be made on information gathered using image sensors and other sensors (e.g., information on a user's eye positions from eye tracking sensors).

In addition to optical components 14, device 10 may contain other electrical components 16. Components 14 and/or 16 may include integrated circuits, discrete components, printed circuits, and other electrical circuitry. For example, these components may include control circuitry and input-output devices.

The control circuitry of device 10 may include storage and processing circuitry for controlling the operation of device 10. The control circuitry may include storage such as hard disk drive storage, nonvolatile memory (e.g., electrically-programmable-read-only memory configured to form a solid-state drive), volatile memory (e.g., static or dynamic random-access-memory), etc. Processing circuitry in the control circuitry may be based on one or more microprocessors, microcontrollers, digital signal processors, baseband processors, power management units, audio chips, graphics processing units, application specific integrated circuits, and other integrated circuits. Software code may be stored on storage in the control circuitry and run on processing circuitry in the control circuitry to implement control operations for device 10 (e.g., data gathering operations, operations involving the adjustment of the components of device 10 using control signals, etc.). Control circuitry in device 10 may include wired and wireless communications circuitry. For example, the control circuitry may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 (e.g., input-output devices in components 16) may be used to allow a user to provide device 10 with user input. Input-output devices may also be used to gather information on the environment in which device 10 is operating. Sensors may be used in gathering eye position information, point-of-gaze information, eye biometric information (retina features, etc.), other biometric information, etc. Output components in the input-output devices may allow device 10 to provide a user with output and may be used to communicate with external electrical equipment.

The input-output devices of device 10 may include one or more displays. In some configurations, a display in device 10 may include left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or or other left and right display devices in alignment with the user's left and right eyes, respectively. In other configurations, the display includes a single display panel that extends across both eyes or uses other arrangements in which content is provided with a single pixel array.

The display of device 10 is used to display visual content for a user of device 10. The content that is presented on the display may include virtual objects and other content that is provided to the display by control circuitry 12 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display).

The input-output circuitry of device 10 may include sensors. The sensors may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in the input-output devices of device 10. If desired, device 10 may include haptic output devices (e.g., vibrating components), light-emitting diodes and other light sources, speakers such as ear speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

Some or all of housing 12 may serve as support structures (see, e.g., housing portion 12T). In configurations in which electronic device 10 is a head-mounted device (e.g., a pair of glasses, goggles, a helmet, a hat, etc.), portion 12T and/or other portions of housing 12 may serve as head-mounted support structures (e.g., structures forming a helmet housing, head straps, temples in a pair of eyeglasses, goggle housing structures, and/or other head-mounted structures). The head-mounted support structures may be configured to be worn on a head of a user during operation of device 10 and may support display(s), lenses, sensors, other input-output devices, control circuitry, and/or other components.

Figure 2:
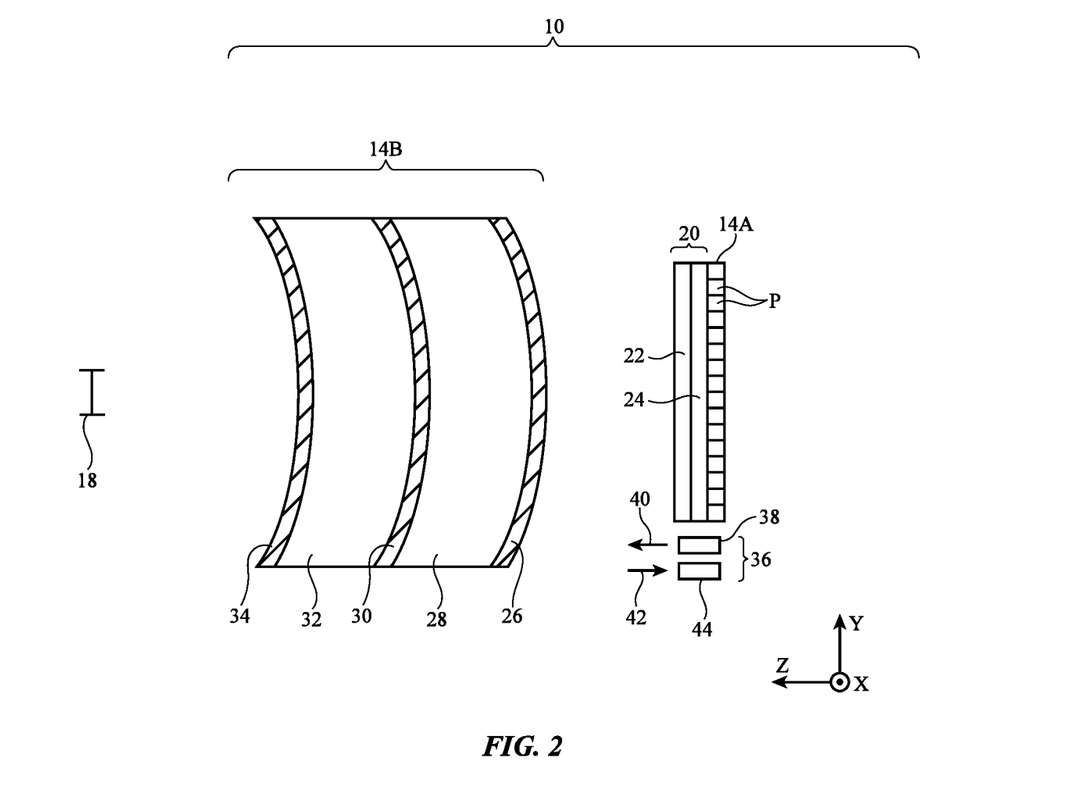
FIG. 2 is a top view of a portion of an illustrative head-mounted device with a lens in accordance with an embodiment.

FIG. 2 is a top view of a portion of electronic device 10 in an illustrative configuration in which electronic device 10 is a head-mounted device. As shown in FIG. 2, electronic device 10 may include display 14A. Display 14A may have an array of pixels P for displaying images for a user. A user with eyes located in a pair of eye boxes such as eye box 18 may view images on display 14A through a pair of lenses such as lens 14B. A single lens 14B and eye box 18 are shown in FIG. 2. Display 14A may include left and right display portions (sometimes referred to as left and right displays, left and right display devices, left and right display components, or left and right pixel arrays).

Optical sensing system 36 may have one or more components that emit light 40 such as light-emitting device 38 and one or more components that detect light 42 such as light-sensing device 44. Optical sensing system 36 may operate at visible light wavelengths, infrared light wavelengths, and/or ultraviolet light wavelengths. In an illustrative configuration, which may sometimes be described herein as an example, optical sensing system 36 operates at infrared wavelengths. Optical sensing system 36 may therefore sometimes be referred to as an infrared sensing system or infrared sensor. Device 38 may be based on one or more light-emitting components such as light-emitting diodes and/or lasers and may operate at one or more wavelengths. As an example, device 38 may be an infrared light-emitting diode and/or infrared laser diode or may have a set of infrared light-emitting diodes and/or infrared laser diodes. Device 44 may be a light detecting component such as a single-element infrared photodetector, a set of multiple infrared photodetectors, a two-dimensional infrared image sensor, and/or other light-sensing components.

Optical sensing system 36 may operate through lens 14B. For example, when a user's eyes are located in eye boxes 18, sensor system 36 may gather information on the user's eyes. This information may be used to support authentication operations (eye biometrics), identification operations (e.g., discriminating between multiple users of device 10), eye position sensing, eye tracking (gaze tracking) operations in which the user's point-of-gaze (direction of view) is monitored, facial recognition operations, or other operations of device 10.

Lens 14B may be a catadioptric lens. During operation, light rays passing from display 14A to eye box 18 follow a folded path through lens 14B. This helps allow the size and weight of lens 14B to be reduced. In the example of FIG. 2, lens 14B has partial mirror (e.g., a half mirror or other mirror with a light transmission of 10-90%, 20-80%, 30-70%, or other suitable light transmission value and a light reflection of 90-10%, 80-20%, 70-30%, or other suitable light reflection value), a wave plate such as quarter wave plate 30, and reflective polarizer 34 (e.g., a linear polarizer that passes light that is polarized along the Y axis and that reflects light that is polarized along the X axis). Mirror 26 may be formed on the outwardly facing surface of transparent lens element 28. This outwardly facing lens element surface may be aspherically convex (as an example). Quarter wave plate 30 may be formed between a cylindrically concave inwardly facing surface of lens element 28 and a corresponding cylindrically convex outwardly facing surface of lens element 32 (e.g., using adhesive bonding that attaches lens element 28 to lens element 32). Reflective polarizer 34 may be formed on an aspherically concave inwardly facing surface of lens element 32. As shown in FIG. 2, polarizer 34 faces eye box 18 and mirror 26 faces display 14A.

In an illustrative arrangement, lens 14B receives circularly polarized image light from display 14A. Display 14A may have an associated circular polarizer such as circular polarizer 20. Linear polarizer 24 of polarizer 20 may receive unpolarized image light from pixels P and may allow linearly polarized light to pass to quarter wave plate 22. Quarter wave plate 22 of circular polarizer 20 may convert linearly polarized light from linear polarizer 24 to circularly polarized light (e.g., right-hand circularly polarized light). In this way, light from display 14A passes to lens 14B as circularly polarized light. Reflections of this light from mirror 26 are suppressed by polarizer 20.

Sensor system 38 and/or the optical components that make up lens 14B may be configure to allow sensor system 38 to operate through lens 14B. For example, one or more of the layers of lens 14B such as the layers forming mirror 26, wave plate 30, and/or polarizer 34 may be configured to have different optical characteristics at visible and infrared wavelengths. This allows lens 14B to pass visible light images from display 14A to eye box 18 while allowing infrared light for system 36 to pass from system 36 through lens 14B to a user's eye in eye box 18 and to subsequently pass from the user's eye in eye box 18 to system 36.

Figure 3:
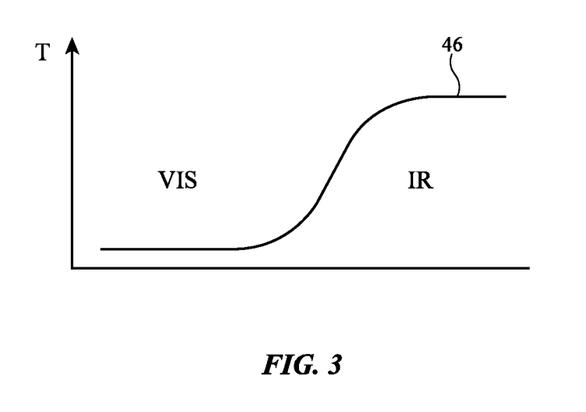
FIG. 3 is a graph showing how an optical component in a lens may have an optical property such as a light transmission parameter that varies as a function of wavelength in accordance with an embodiment.

In an illustrative configuration, polarizer 34 may be configured to be transparent at infrared wavelengths (e.g., at a wavelength of 810 nm and/or other near infrared wavelengths). When light is linearly aligned along the pass axis of polarizer 34, polarizer 34 may exhibit a light transmission value of 100% or nearly 100% for visible light and infrared light. When light is linearly polarized orthogonally to the pass axis, visible light will be blocked and infrared light will be transmitted. As shown by curve 46 of the graph of FIG. 3, for example, polarizer 34 may, for light that is polarized orthogonal to the pass axis of polarizer 34, exhibit a visible light transmission value T (e.g., at a visible light wavelength of 500 nm or other suitable visible light wavelength) that is less than 50%, less than 30%, less than 20%, less than 10%, or other suitable fraction of its infrared light transmission value (e.g. at an infrared wavelength of 810 nm or other suitable infrared wavelengths). By exhibiting more infrared light transmission than visible light transmission, the amount that infrared light associated with system 36 (e.g., emitted light 40 and/or sensed light 42) is attenuated by passing through lens 14B may be reduced. If desired, other optical characteristics of the optical components in device 10 may be configured to be different between infrared and visible wavelengths. For example, other component(s) may have characteristics that differ by at least 40%, at least 50%, at least 80%, or other suitable amount between visible and infrared wavelengths (e.g., wave plate 30 may be effective as a quarter wave plate only at visible light wavelengths and not at infrared light wavelengths). Arrangements in which the infrared light transmission of polarizer 34 is enhanced relative to the visible light transmission of polarizer 34 may sometimes be described herein as an example.

Figure 4:
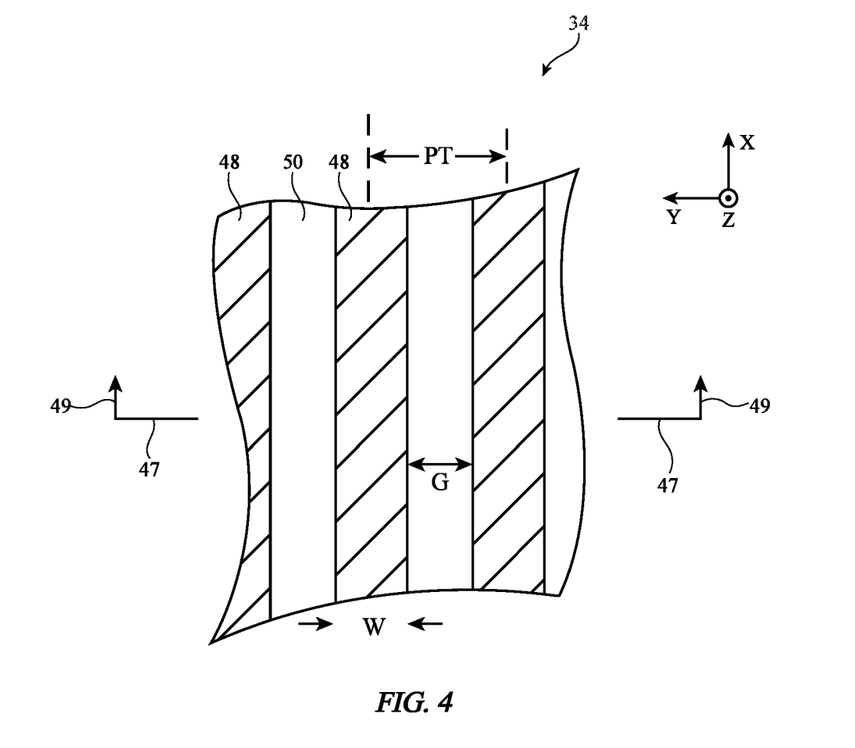
FIG. 4 is a top view of an illustrative wire grid polarizer in accordance with an embodiment.

A portion of an illustrative reflective polarizer such as polarizer 34 is shown in FIG. 4. In the example of FIG. 4, polarizer 34 is a wire grid polarizer (sometimes referred to as a wire grid film polarizer) having a series of parallel conductive lines 48. Lines 48 (which may sometimes be referred to as elongated strips) may be formed from a conductive material separated by respective gaps G. Lines 48 of FIG. 4 run parallel to each other along the X axis. In this type of arrangement, polarizer 34 will pass light that is linearly polarized along the Y axis (the pass axis of polarizer 34 is along the Y axis) and will reflect light (and thereby block light) that is linearly polarized along the X axis.

Figure 5:
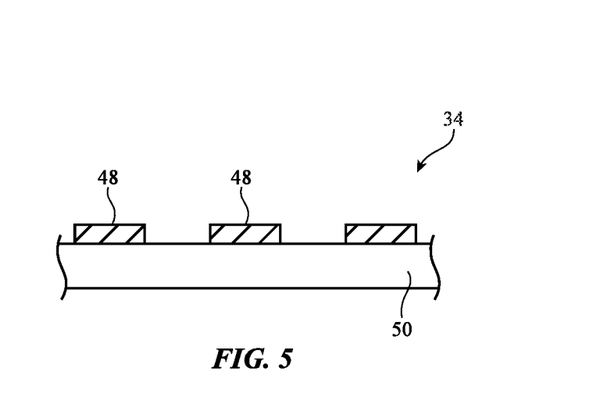
FIG. 5 is a cross-sectional side view of the wire grid polarizer of FIG. 4 in accordance with an embodiment.

Lines 48 may be characterized by a width W of 50 nm, at least 15 nm, at least 30 nm, less than 200 nm, less than 100 nm, or other suitable width and a pitch PT of about 90-100 nm, at least 30 nm, at least 45 nm, less than 180 nm, less than 120 nm, or other suitable pitch. The thickness of lines 48 in dimension Z may be about 30 nm, at least 3 nm, at least 6 nm, at least 15 nm, less than 300 nm, less than 150 nm, less than 70 nm, 10-90 nm, and/or other suitable thickness. Lines 48 may be deposited on a dielectric substrate such as substrate 50 and may be pattered by etching, lift-off, shadow masking, printing, and/or other patterning techniques suitable for patterning a conductive thin-film layer. A cross-sectional side view of polarizer 34 of FIG. 4 taken along line 47 and viewed in direction 49 is shown in FIG. 5. Substrate 50 may be a polymer film (e.g., optical polycarbonate or other transparent polymer) or an inorganic polymer material. The thickness of substrate 50 may be about 1-9 microns, 3 microns, at least 0.2 microns, at least 0.7 microns, at least 1.5 microns, less than 6 microns, less than 4 microns, or other suitable thickness. Optional coatings (e.g., to prevent degradation of lines 48, etc.) may be formed on polarizer 34. If desired, the structures of polarizer 34 and/or other optical layers in lens 14B may be formed as coatings on lens elements such as lens elements 32 and/or 28. Arrangements in which polarizer 34 and other optical layers are formed as stand-alone films that are attached to lens elements 32 and/or 28 using adhesive may sometimes be described herein as an example.

To enhance infrared light transmission of lines 48 relative to visible light, lines 48 may be formed from a material with enhanced infrared light transmission relative to visible light. This material may be a nanomaterial formed from a mixture of two or more materials having feature sizes of about 1-1000 nm, at least 10 nm, at least 100 nm, less than 500 nm, less than 200 nm, or other suitable size. The nanomaterial may have subwavelength features that form a photonic crystal (as an example).

With an illustrative configuration, the material of lines 48 contain a mixture of a first material with a second material. The first material may form islands within a film formed of the second material as illustrated by the islands of first material 52 that are formed within the layer of second material 54 in the illustrative discontinuous material of lines 48 of FIG. 6 or the first material may form continuous filaments of material within the second material as illustrated by irregular strands (continuous filaments) of first material 52 within the irregular strands (continuous filaments) of second material 54 in the material of lines 48 of FIG. 7. In an illustrative arrangement, the first material is a metal (e.g., aluminum) and the second material is a semiconductor (e.g., silicon or germanium). The patterned Al—Si materials of FIGS. 6 and 7 may be formed by co-sputtering the first and second materials (and, if desired, low-temperature annealing these materials under vacuum).

Figure 6:
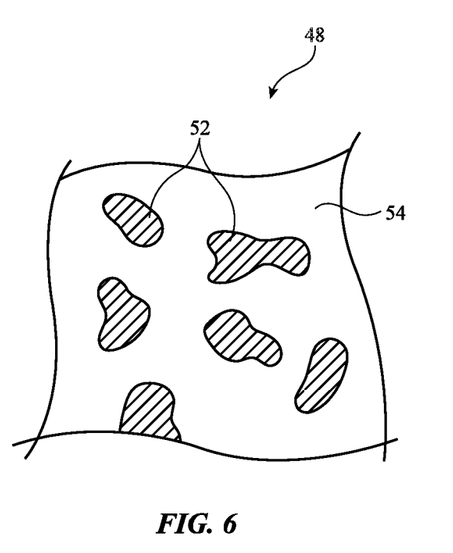
FIGS. 6 and 7 are top views of conductive layers that may be patterned into wires for a wire grid polarizer in accordance with an embodiment.
Figure 7:
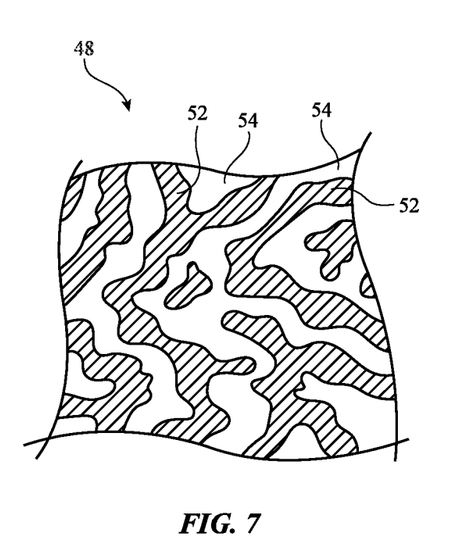

The structures of FIGS. 6 and 7 (e.g., the first regions of the first material and the second regions of the second material) may have subwavelength feature sizes (e.g., widths less than 300 nm, less than 150 nm, less than 75 nm, less than 30 nm, or other suitable size). In the arrangement of FIG. 7, a distinct phase separation is created during processing (e.g., spinodal decomposition) to create a spinodal pattern.

Silicon and germanium are opaque at visible wavelengths and transparent at infrared wavelengths. The incorporation of semiconductors such as silicon and/or germanium into polarizer 34 may help allow polarizer 34 to operate as a reflective polarizer at visible light wavelengths and as a transparent (non-polarizing) layer at infrared wavelengths. Other materials (e.g., other non-metals such as other semiconductors and/or other dielectrics, etc.) may also be used to help enhance infrared light transmission relative to visible light transmission.

The infrared transmission of silicon is greater than the infrared transmission of germanium, so incorporation of silicon into the material of lines 48 may enhance infrared light transmission (e.g., at 810 nm). The infrared transmission of germanium cuts off at about 600 nm, whereas silicon may be transparent at shorter wavelengths (e.g., silicon may exhibit a cutoff wavelength of 350 nm). As a result, the incorporation of germanium into the material of layer 48 instead of silicon may help enhance the ratio of light transmission at a desired infrared wavelength associated with operation of system 36 (e.g., a wavelength of 810 nm for light 40 and 42 of FIG. 2, as an example) to light transmission at a given visible light wavelength (e.g., 500 nm, as an example). Other semiconductors, dielectric materials, and/or metals may be incorporated into the material forming lines 48 of polarizer 34 to enhance infrared light transmission relative to visible light transmission, if desired.

By using a two-part material such as an aluminum-silicon mixture with separate regions of aluminum and silicon or other material for lines 48 that exhibits enhanced infrared light transmission (e.g., relative to visible light transmission and/or relative to the infrared light transmission that would be present if lines 48 were formed from pure aluminum or other metal), the transmission of light 40 and 42 through lens 14B may be enhanced and the performance of optical system 36 may be enhanced.

When polarizer 34 has enhanced infrared light transmission, the transmission of emitted light 40 through polarizer 34 and the transmission of counterpropagating light 42 that has reflected off of a user's eye in eye box 18 is enhanced, particularly when the polarization state of light 40 and/or 42 is orthogonal to the pass axis of polarizer 34 upon passing through polarizer 34. Because infrared light transmission is enhanced and the light-blocking properties of polarizer 34 are reduced for infrared light, system 36 may, if desired, use unpolarized light-emitting and light-sensing components (e.g., component 38 may emit unpolarized infrared light and/or component 44 may detect unpolarized infrared light).

In addition to or instead of enhancing the infrared light transmission of polarizer 34 (e.g., by forming lines 48 from an aluminum-silicon material or other material with enhanced infrared transmission), the performance of sensor system 36 can be enhanced by controlling the polarization state of light 40 and 42 as light 40 and 42 passes through lens 14B (e.g., so that light 40 and 42 are linearly polarized in alignment with the pass axis of polarizer 34).

Figure 8:
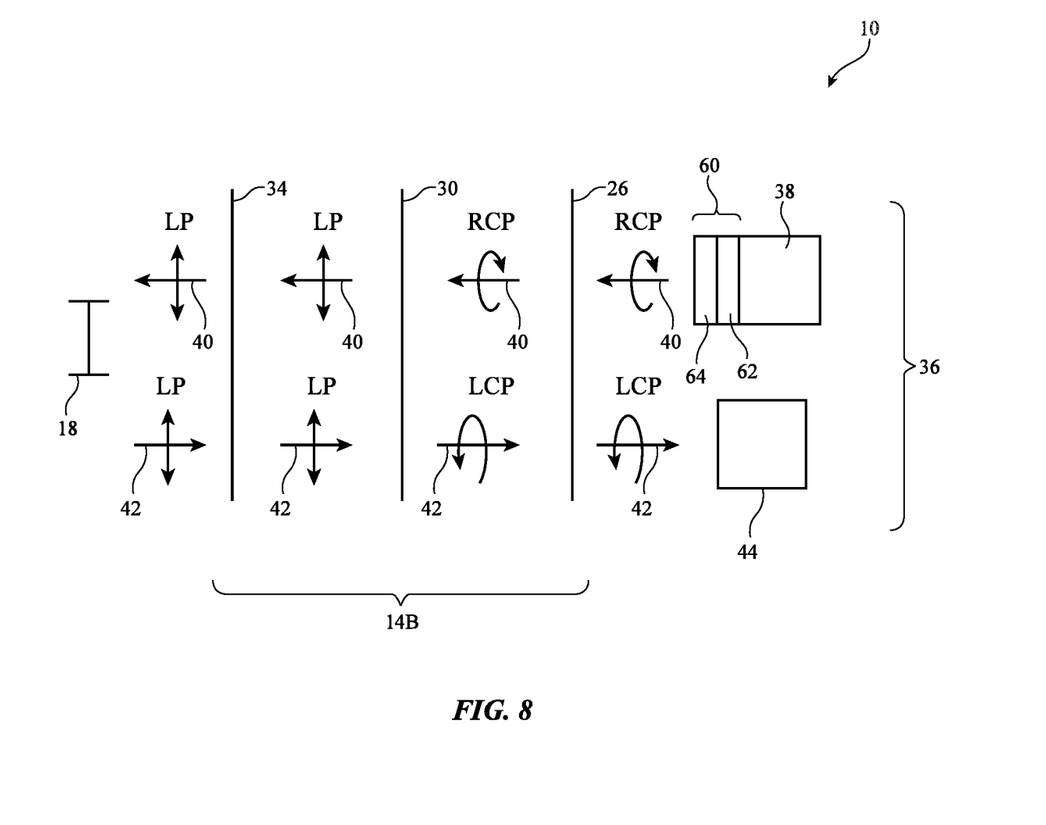
FIGS. 8, 9, 10, and 11 are side views of illustrative arrangements for operating an infrared sensor through a lens with optical components in accordance with an embodiment.

Consider, as an example, the arrangement of FIG. 8 in which device 38 has been provided with a circular polarizer so that emitted light 40 from device 38 has circular polarization. As shown in FIG. 8, light-emitting device 38 may be configured to emit light 40 that is right-hand circularly polarized (RCP). Device 38 of FIG. 8 may have a polarizer such as circular polarizer 60. Circular polarizer 60 may have linear polarizer 62 and quarter wave plate 64. Linear polarizer 62 of circular polarizer 60 may be interposed between quarter wave plate 64 and device 38. Light 40 that is emitted by device 38 may initially be linearly polarized or may become linearly polarized upon passing through linear polarizer 62. After passing through quarter wave plate 64, light 40 of FIG. 8 has right hand circular polarization. Mirror 26 is partially reflective and partially transparent to visible light and to infrared light 40 (e.g., the transmission of mirror 26 is at least 10%, at least 40%, less than 90%, less than 60%, etc.). Light 40 remains right-hand circularly polarized after passing through mirror 26. Quarter wave plate 30 converts circularly polarized light to linearly polarized light. Linearly polarized light 40 exiting quarter wave plate 30 is aligned with the pass axis of polarizer 34 and illuminates a user's eye in eye box 18, thereby producing counterpropagating light 42 that is characterized by linear polarization aligned with the pass axis of polarizer 34. After passing through quarter wave plate 30, light 42 becomes left-hand circularly polarized and this polarization state is preserved as light 42 passes through mirror 26. Light-sensing device 44 of FIG. 8 may be polarization insensitive and may therefore can sense light 42. As this example demonstrates, polarizer 34 need not be provided with infrared-transparent lines 48 in arrangements in which infrared light 40 and 42 is linearly polarized along the pass axis of polarizer 34 when passing through polarizer 34.

Figure 9:
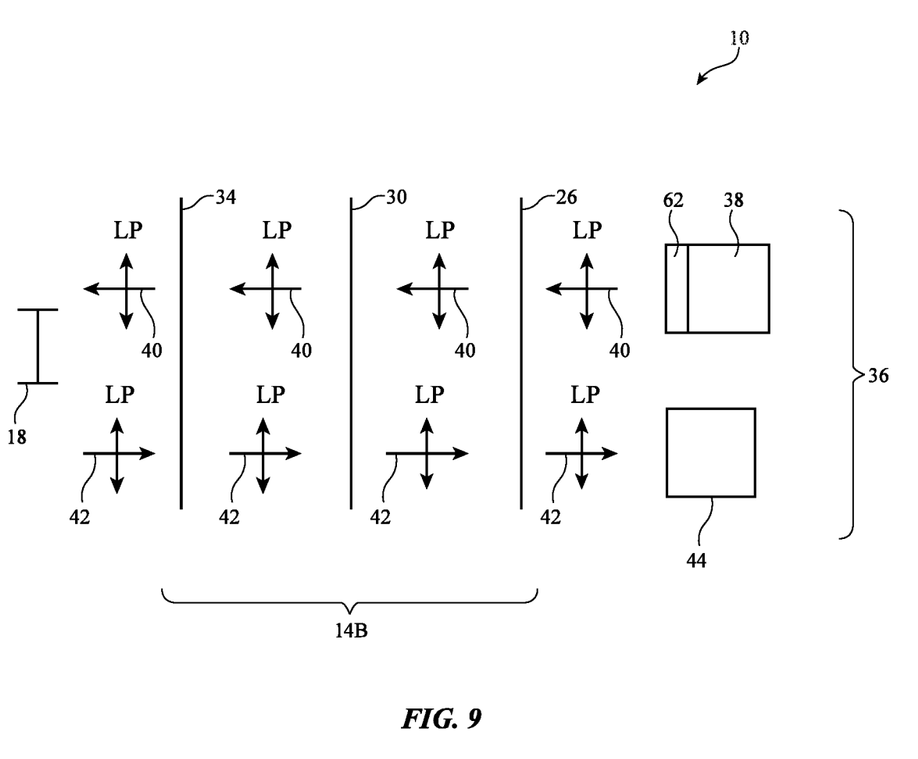

Another illustrative arrangement is shown in FIG. 9. In the illustrative configuration of FIG. 9, quarter wave plate 30 does not serve as a quarter wave plate at infrared wavelengths and is transparent to infrared light. Light-emitting device 38 may have a polarizer such a linear polarizer 62 and/or may otherwise be configured to emit infrared light 40 that is linearly polarized. Mirror 26 is partially transparent and transmits light 40 without changing the polarization of light 40. Quarter wave plate 30 may be formed from a cholesteric liquid crystal film or other material that is transparent to infrared light and that does not serve as a quarter wave plate at infrared wavelengths and that forms a quarter wave plate at visible light wavelengths. At visible light wavelengths, quarter wave plate 30 converts the polarization of light passing through quarter wave plate 30. Because quarter wave plate 30 is only effective at visible light wavelengths, however, linearly polarized infrared light 40 that is received from mirror 26 passes through plate 30 without any change to its polarization state. This infrared light 40 remains linearly polarized in alignment with the pass axis of linear polarizer 40. Reflected infrared light 42 is also linearly polarized in alignment with the pass axis of linear polarizer 40. Reflected infrared light 42 passes through plate 30 without change to its polarization state. Linearly polarized infrared light 42 from plate 30 then passes through mirror 26 and is received as linearly polarized light by light-sensing device 44, which may be insensitive to polarization.

Figure 10:
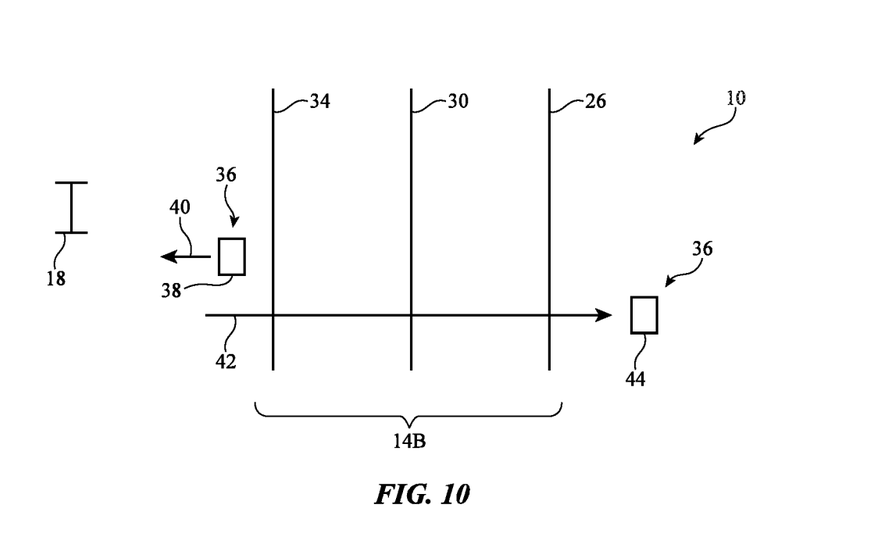
Figure 11:
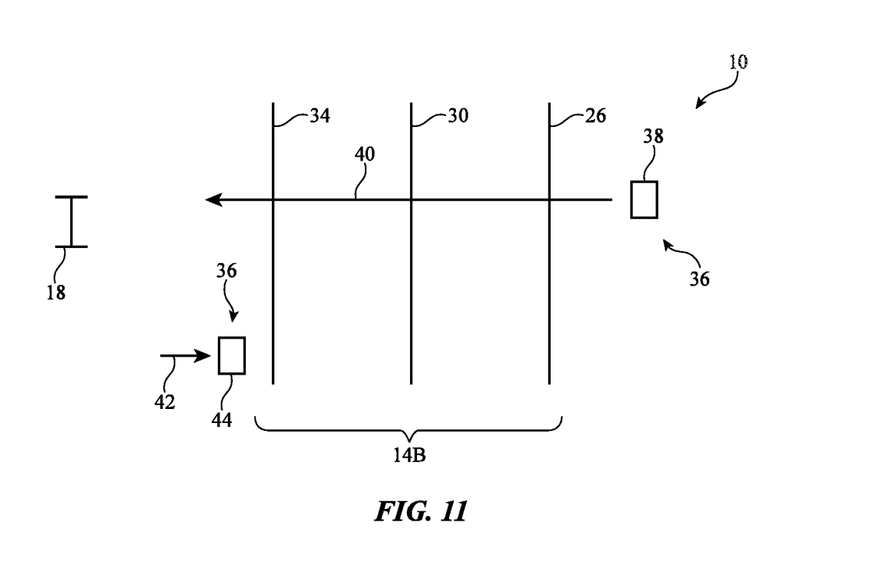

Two additional illustrative configurations for device 10 are shown in FIGS. 10 and 11.

In the example of FIG. 10, light-emitting device 38 is located between polarizer 34 and eye box 18, so light 40 does not pass through lens 14B. Light 40 may have a linear polarization that is aligned with the pass axis of polarizer 34 (e.g., device 36 may have a linear polarizer or may otherwise be configured to emit linearly polarized light). Reflected light 42 will be linearly polarized in alignment with this pass axis when passing from eye box 18 through polarizer 34 to quarter wave plate 30. Quarter wave plate 30 may convert the linear polarization of this light 42 to circular polarization. Circularly polarized light 32 from plate 30 will pass through mirror 26 without changing its polarization state. Device 44 may be insensitive to the polarization state of incoming light and can therefore sense circularly polarized light 42 passing through mirror 26.

In the example of FIG. 11, light-sensing device 44 is located between lens 14B and eye box 18, whereas lens 14B is located between light-emitting device 38 and eye box 18. Light-emitting device 38 emits infrared light 40 that passes through mirror 26 without changing its polarization state.

In a first configuration of device 10 of FIG. 11, quarter wave plate 30 is transparent to infrared light and does not change the polarization of light 40. In this first configuration, device 38 emits light 40 that is linearly polarized, so that light 40 that reaches polarizer 34 is linearly polarized in alignment with the pass axis of polarizer 34. Reflected light from eye box 18 reaches light-sensing device 44 without passing through lens 14B. Light-sensing device 44 may be insensitive to the polarization state of received light and can therefore sense light 42.

In a second configuration of device 10 of FIG. 11, quarter wave plate 30 serves as a quarter wave plate for infrared light. Device 38 has a circular polarizer so that emitted light 40 from device 38 is circularly polarized when passing through mirror 26 and becomes linearly polarized in alignment with the pass axis of polarizer 34 when passing through quarter wave plate 30. Reflected light (e.g., infrared light 42) reaches light-sensing device 44 without passing through lens 14B. Light-sensing device 44 may be insensitive to the polarization state of received light and can therefore sense light 42.

Regardless of the configuration used for device 10 (see, e.g., the arrangements of FIGS. 2, 8, 9, 10, and/or 11), infrared transparent structures may be incorporated into mirror 26 and/or into polarizer 34 to help enhance infrared light transmission and thereby enhance the performance of sensor system 36. For example, polarizer 34 may include lines patterned from a thin film having first regions of first material and second regions of a second material where the first regions are discontinuous islands surrounded by the second material or where that the first and second regions form continuous filaments, mirror 26 may be formed from a thin film having first regions of first material and second regions of a second material where the first regions are discontinuous islands surrounded by the second material or where that the first and second regions form continuous filaments, and/or polarizer 34, mirror 26, or other lens structures may be formed from other structures that have an enhanced infrared transmission relative to visible light transmission.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a display;
   a lens through which the display is visible from an eye box;
   an infrared sensor system having an infrared light-emitting device that emits infrared light that serves as illumination in the eye box and an infrared light-sensing device that detects infrared light from the eye box; and
   a head-mounted support structure, wherein the head-mounted support structure is configured to support the display, the lens, and the infrared sensor system, wherein the lens comprises a catadioptric lens having a wire grid polarizer formed from parallel lines and wherein the parallel lines each include first regions of a first material and second regions of a second material.

2. The head-mounted device defined in claim 1 wherein the first material comprises a metal.

3. The head-mounted device defined in claim 2 wherein the second material comprises a non-metal.

4. The head-mounted device defined in claim 3 wherein the second material comprises a semiconductor.

5. The head-mounted device defined in claim 4 wherein the second material comprises silicon.

6. The head-mounted device defined in claim 4 wherein the second material comprises germanium.

7. The head-mounted device defined in claim 1 wherein the first regions form islands within the second regions.

8. The head-mounted device defined in claim 1 wherein the first regions are first continuous regions and wherein the second regions are second continuous regions.

9. The head-mounted device defined in claim 1 wherein the infrared light-emitting device has a quarter wave plate and wherein the infrared light that is emitted by the infrared light-emitting device is circularly polarized after passing through the quarter wave plate.

10. The head-mounted device defined in claim 1 wherein the infrared light-emitting device is between the wire grid polarizer and the eye box.

11. The head-mounted device defined in claim 1 wherein the infrared light-sensing device is between the eye box and the wire grid polarizer.

12. The head-mounted device defined in claim 1 wherein the catadioptric lens comprises a layer that forms a visible-light quarter wave plate and that is transparent at infrared wavelengths and does not form a quarter wave plate at the infrared wavelenghts.

13. The head-mounted device defined in claim 12 wherein the layer comprises a cholesteric liquid crystal layer.

14. The head-mounted device defined in claim 1 wherein the infrared light-sensing device comprises a two-dimensional infrared image sensor.

15. A head-mounted device, comprising:
    a display;
    a lens through which the display is visible from an eye box;
    an infrared sensor system having a light-emitting device that emits infrared light that serves as illumination in the eye box and an infrared two-dimensional image sensor that detects infrared light from the eye box; and
    a head-mounted support structure, wherein the head-mounted support structure is configured to support the display, the lens, and the infrared sensor system and wherein the lens comprises a catadioptric lens having a wire grid polarizer that exhibits more infrared light transmission than visible light transmission.

16. The head-mounted device defined in claim 15 wherein the polarizer is formed from parallel conductive lines, wherein the parallel conductive lines each include first regions of a first material and second regions of a second material, and wherein the wire grid polarizer exhibits, for light that is linearly polarized orthogonal to a pass axis of the polarizer, a first light transmission at a wavelength of 0.5 microns and a second light transmission at a wavelength of 0.81 microns that is greater than the first light transmission.

17. The head-mounted device defined in claim 16 wherein the first regions are first continuous filaments and wherein the second regions are second continuous filaments and wherein the first material is a metal.

18. The head-mounted device defined in claim 16 wherein the first material is a metal and the second material is a semiconductor.

19. A head-mounted device, comprising:
    a display;
    a lens through which the display is visible from an eye box;
    an infrared sensor system having a light-emitting device that emits infrared light that passes through the lens and that serves as illumination in the eye box and an infrared two-dimensional image sensor that detects infrared light from the eye box that has passed through the lens; and
    a head-mounted support structure, wherein the head-mounted support structure is configured to support the display, the lens, and the infrared sensor system, wherein the lens comprises a catadioptric lens having a polarizer, a layer that serves as a quarter wave plate at visible light wavelengths and that does not serve as a quarter wave plate at infrared wavelengths, and a partial mirror.

20. The head-mounted device defined in claim 19 wherein the layer comprises a cholesteric liquid crystal layer.

21. The head-mounted device defined in claim 19 wherein the polarizer comprises parallel conductive lines on a transparent substrate and wherein each of the parallel conductive lines comprises a metal and a non-metal.

22. The head-mounted device defined in claim 21 wherein the non-metal comprises a semiconductor.

23. An electronic device, comprising:
    a support structure;
    a transparent structure coupled to the support structure; and
    an infrared sensor system comprising an infrared light-emitting device that emits infrared light through the transparent structure and an infrared light-sensing device that detects infrared light through the transparent structure, wherein the transparent structure comprises a wire grid polarizer that exhibits more infrared light transmission than visible light transmission.

24. The electronic device defined in claim 23 wherein the wire grid polarizer comprises parallel lines and wherein the parallel lines each include first regions of a first material and second regions of a second material.

25. The electronic device defined in claim 24 wherein the first material comprises a metal and the second material comprises a non-metal.

26. The electronic device defined in claim 23 wherein the support structure is a head-mountable support structure.

27. The electronic device defined in claim 26 wherein the transparent structure is a lens, the electronic device further comprising:
   a display visible through the lens from an eye box.

\* \* \* \* \*